March 21, 1950 C. J. ST. PETER 2,501,013
WINDSHIELD ATTACHMENT
Filed Dec. 23, 1946
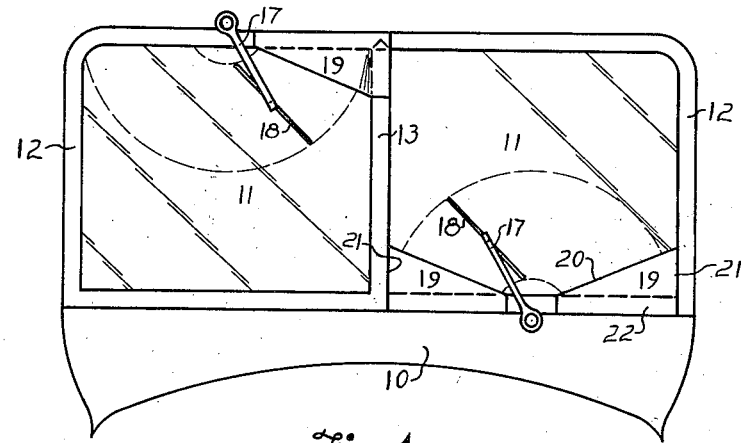
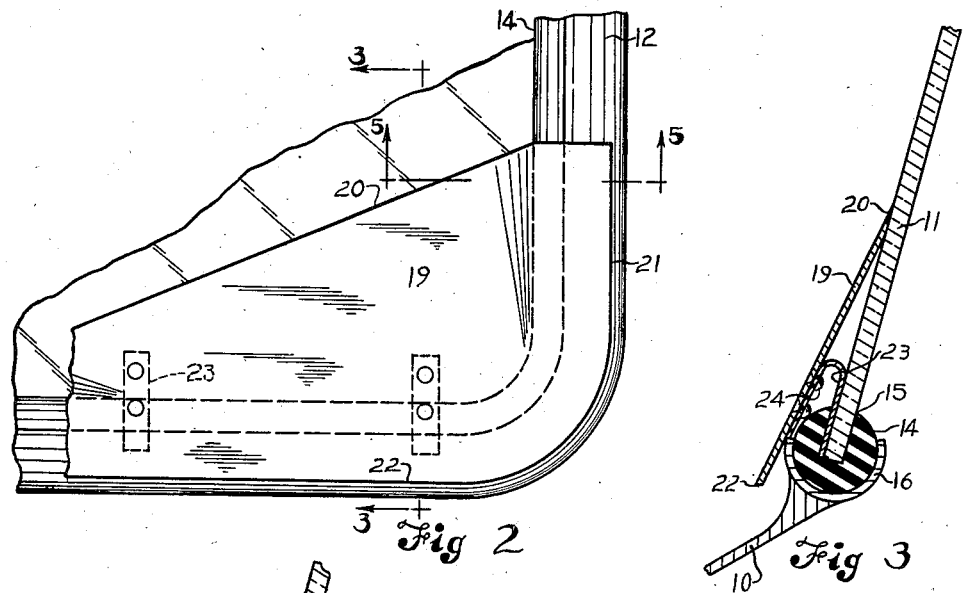
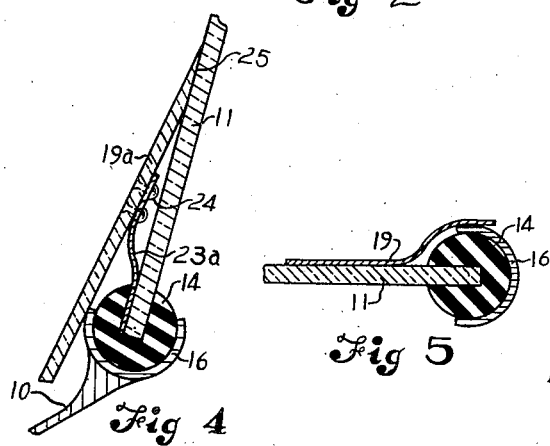
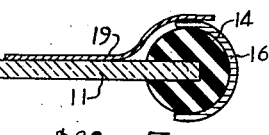
INVENTOR.
Cyprian J. St. Peter
BY
Martin E. Anderson
ATTORNEY Patented Mar. 21, 1950

2,501,013

UNITED STATES PATENT OFFICE 2,501,013

WINDSHIELD ATTACHMENT

Cyprian J. St. Peter, Denver, Colo.

Application December 23, 1946, Serial No. 718,088

3 Claims. (Cl. 296—95)

This invention relates to improvements in attachments for windshields.

Pleasure automobiles and trucks are all provided with windshields and automatic windshield wipers. The windshield wipers of the usual construction comprise an arm that oscillates about a pivot positioned either below of above the windshield frame and which carries a wiper blade. The wiper blade moves moisture and snow downwardly to the lower side of the windshield frame if it is positioned at the bottom, or upwardly if it is positioned at the top.

When an automobile equipped with the usual windshield wiper and having the conventional windshield frame is operated in a snowstorm, experience has shown that the snow will accumulate on the windshield along the lower side of the frame or, if the wiper operates near the top, along the top of the frame.

The reason for this accumulation of snow in the positions indicated is that the windshields are set in frames that project a considerable distance to the front of the outer surface of the windshield. The frame, therefore, forms a ledge which holds the snow and which results in a gradual accumulation of snow along the lower surface until it sometimes happens that the windshield wiper becomes inoperative due to the limitation in the length of its stroke.

It is the object of this invention to produce a simple attachment that can be readily applied to any windshield provided with an oscillating wiper, and which will provide a smooth, inclined surface on which the snow may pass to the outside of the frame and which, in other words, forms a bridge over the angular depression between the windshield and the frame.

Having thus stated the objects of the invention, and, in a general way, outlined its construction, the invention will now be described in detail and for this purpose reference will be had to the accompanying drawing in which the invention has been illustrated in its preferred form, and in which:

Figure 1 is a front view of a windshield showing the same equipped with two windshield wipers and with the improved attachment that forms the subject of this invention;

Figure 2 is a fragmentary front elevation of a windshield and frame showing the attachment in position thereon and to an enlarged scale;

Figure 3 is a section taken on line 3—3, Figure 2;

Figure 4 is a section similar to that shown in Figure 3, but shows the attachment formed from a heavier material such as a transparent plastic or glass; and Figure 5 is a section taken on line 5—5, Figure 2, showing a detail of the construction.

In the drawing reference numeral 10 designates the cowl of an automobile and reference numerals 11 the two halves of the windshield. Each part of the windshield is positioned in a frame that has been designated by reference numeral 12 and which has a central frame member 13, as shown. The frames are constructed in various ways, but in the present embodiment they have been shown as formed from a resilient strip 14 which may be made of rubber, plastic or any other nonmetallic material. These strips are provided with grooves 15 for the reception of the edges of the windshield, as shown in Figures 3 and 4. Resilient strip 14 is positioned in a metal frame 16 that may be curved somewhat as shown in the drawing, or of any other suitable shape. The frame part 16 is connected, either integrally or otherwise, with cowl 10. The arms of the windshield wipers have been designated by reference numeral 17 and the blades by 18. The mechanism by means of which the wipers are oscillated has not been shown, but the path of the blade has been indicated in a general way by broken lines in Figure 1.

Windshield wipers are usually so constructed that the blade will move into parallel relation with the lower frame member when the wiper is not in use and during operation it tends to operate on maximum stroke.

If the automobile is driven in a snowstorm, whether the snow is wet or dry, the snow removed by the blade will be deposited along the lower edge of the windshield directly above the frame and each stroke will add to the thickness of the accumulation until often times the wiper becomes inoperative.

In order to prevent the snow from accumulating in the manner just described and to facilitate its removal, a sheet of material like that designated by reference numeral 19 is positioned somewhat as shown in the drawings, at one or both corners of the windshield, in such a way that the upper inclined edge that has been designated by reference numeral 20, rests againsts the outer surface of the windshield and the edges 21 and 22 extend downwardly beyond the frame. Such a sheet, if made from metal or plastic that permits the snow to slide freely, is positioned directly beneath the extreme downward movement of the blade, the snow, instead of piling up on the frame, will collect on the smooth inclined surface and slide downwardly onto the cowl. The upper edge of the sheet 19 is preferably beveled so as to present a knife edge that comes into very close contact with the outer surface of the windshield and the snow will therefore have no opportunity to lodge at the point where the sheet intersects the windshield. It is also permissible to extend the sheet upwardly sufficiently so that the blade of the wiper will travel downwardly a short distance over the sheet, thereby further facilitating the removal of the snow.

Attention has been directed in the above parts of the specification to the fact that windshields have their edges positioned in a groove in a resilient member like 14. The material employed is usually rubber composition of such hardness that it can be readily deformed. Advantage is taken of this for securing the sheet 19 in place and the latter is provided with two or more spring fingers 23 that have been shown as held in position by means of rivets 24, but which may be spot-welded to the sheet if the latter is of metal, or may be secured thereto in any other suitable way. The free ends of members 23 are then inserted in groove 15 adjacent the outer surface of the windshield as shown in Figure 3. As many of these connector elements may be used as found necessary or desirable.

In Figure 4, a slightly different form of sheet has been shown and has been designated by reference numeral 19a. Sheet 19a may be made from some suitable plastic or from glass and provided with attaching elements 23a that are secured by rivets 24. When the sheet has considerable thickness, as shown in Figure 4, the upper edge must be beveled as indicated at 25 so as to form a knife edge where it fits along the windshield.

In Figure 1 the vertical edges of sheets 19, which have been designated by reference numeral 21, terminate along the inside edge of the frame.

When sheet 19 is fitted to the windshield as shown in Figure 1, it may be formed from a piece of material that is substantially triangular and slightly warped so as to permit the edge 20 to contact the outer surface of the windshield and at the same time have the lower edge in contact with the frame.

In Figures 2 and 5 a construction has been shown in which the sheet 19 is shaped so as to fit over the vertical side of the windshield frame and against the outer surface of the windshield. When the sheet is shaped in this manner, it can be easily installed and is more certain to give a close fit than if an unformed sheet is used.

Having described the invention what is claimed as new is:

1. In combination with an automobile windshield having a grooved frame into which the edges of the windshield project and an oscillating windshield wiper, means for facilitating the removal of snow from the windshield comprising a smooth sheet of material upon which snow or the like may slide, positioned with one edge in close contact with the outer surface of the windshield and another edge lapping the frame, forming a bridge from the windshield to the outside of the frame, said first edge being contiguous with the wiper when at one limit of its stroke, and means for holding the sheet in position.

2. In combination with an automobile windshield having a grooved frame into which the edge of the windshield projects, which extends beyond the surface of the windshield forming a rim, and an oscillating windshield wiper, means for facilitating the removal of snow comprising a smooth sheet upon which snow or the like may slide, having one edge in contact with the outer surface of the windshield contiguous with the wiper blade when at one limit of its stroke another edge lapping the frame forming an inclined bridge, and means for securing the sheet in position.

3. In combination with a windshield having a grooved frame into which the edges project, and an oscillating windshield wiper blade, means for facilitating the removal of snow comprising a smooth plate of substantially triangular shape upon which snow or the like may slide, positioned with one edge in engagement with the outer surface of the windshield in the path of the wiper blade, another edge overlapping the frame forming an inclined surface from the windshield to the outside of the windshield frame providing an unobstructed path for snow, and means for securing the plate to the windshield frame.

CYPRIAN J. ST. PETER.

REFERENCES CITED

The following references are of record in the file of this patent:

UNITED STATES PATENTS

| Number | Name | Date |
| --- | --- | --- |
| 2,173,196 | Bornemann | Sept. 19, 1939 |
| 2,389,002 | Schatzman et al. | Nov. 13, 1945 |